April 30, 1935.    F. J. SPANG    1,999,706
COUPLING
Filed Jan. 25, 1934    2 Sheets-Sheet 1
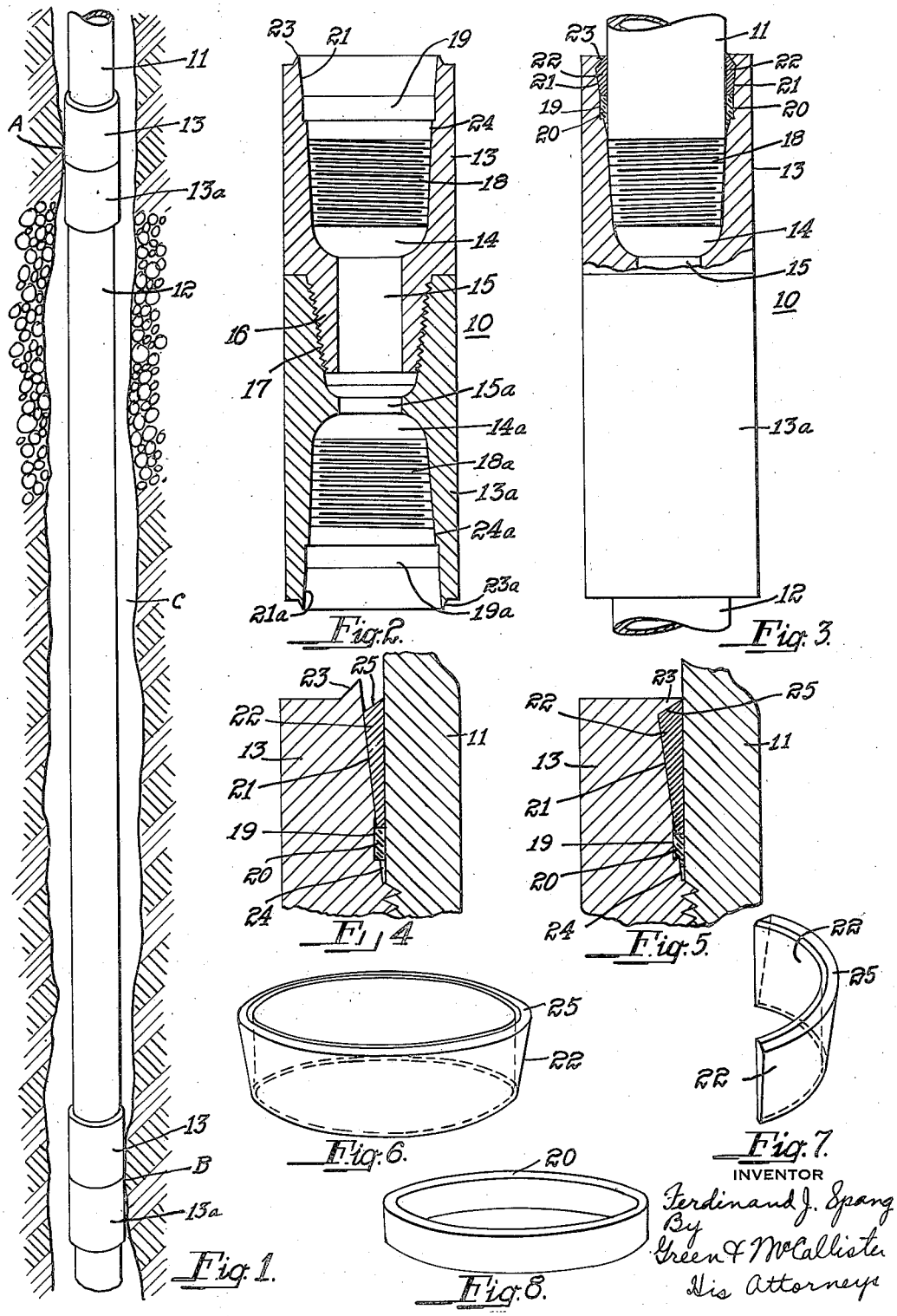

April 30, 1935.  F. J. SPANG  1,999,706
COUPLING
Filed Jan. 25, 1934  2 Sheets-Sheet 2

INVENTOR
Ferdinand J. Spang
By Green & McCallister
His Attorneys

Patented Apr. 30, 1935

1,999,706

UNITED STATES PATENT OFFICE 1,999,706

COUPLING

Ferdinand J. Spang, Butler, Pa.

Application January 25, 1934, Serial No. 708,220

10 Claims. (Cl. 285—146)

This invention relates to couplings and the like for use with well drill pipe, casing, and similar tubes, which are subjected when in use to vibrations and stresses of great magnitude, and more particularly to a coupling having auxiliary reinforcing and strengthening means which will dampen the vibration and eliminate to a great extent, the tube breakage ordinarily encountered at the coupling.

In the drilling for, and the subsequent production of, gas, oil, and other sub-surface fluids, metallic tubes are used for many purposes which take their names from the work they ordinarily perform. Thus, "casing" is the series of steel or iron tubes inserted in the bore hole after a certain portion thereof has been completed to case off or hold back any formation of substance that might prove a menace to subsequent drilling operations. "Drive pipe" is a series of steel or iron tubes which are driven into the bore hole when it is necessary to continuously follow the drilling tools with pipe to prevent the sub-surface formations from caving into the bore hole. The lower end of the drive pipe is provided with a heavy steel drive shoe which shears off the wall of the pilot bore hole, and enlarges it to permit the passage of the shoe after which the pipe and couplings may follow.

"Drill pipe" is a series of steel or iron tubes which are used in the hydraulic rotary method of drilling for transmitting a rotative force, generated at the surface, to the bit or drill at the bottom of the bore hole. In addition to the transmittal of the rotative force, the drill pipe conveys, under high pressure, a mud laden drilling fluid, known as rotary mud, to the bottom of the hole which accelerates the boring operation and floats the drill cuttings to the surface through the space between the drill pipe and the well bore. These tubes also act as a guide in determining the straightness and the direction of the bore hole.

All of these various types of tubes which are subjected to excessive pressures, stresses and vibrations are connected or attached to each other with screw threaded couplings or to other screw threaded accessories or tool joints, by means of screw threads formed on the ends of the tubes. The threads on the ends of the tubes are generally formed on a slight diametrical taper, and consequently, when a coupling or other accessory is threaded tightly thereover a considerable compressive stress is developed in the tubes throughout the length of the threaded engagement. Such stress terminates abruptly at the end of the threads with the result that the condition of the tube is changed from a state of stress to a state of rest within a narrowly limited area. The effect of this stress is increased due to the fact that a considerable portion of the sectional area of each tube is cut away to form the thread. This increase, however, is not limited to the loss of material removed in forming the thread, but is of much greater magnitude due to the resultant irregularity of the surface of the tube and to the severing of a portion of its fiber structure, both of which conditions tend to more definitely define the termination point of any stresses to which the tubes are subjected.

As a result of the pressures, stresses and vibrations to which the tubes are subjected there is frequent breakage adjacent the top of the thread of the joint and to overcome this tendency, it has been the practice in the past, especially in connection with drill pipe, to internally upset the ends of the tubes, which upset portion extending beneath and beyond the usual threaded portion. With pipes having an internally upset portion the effect of changing the mass of the tube at that point has been to localize therein the dampening out of the high pitched vibrations arising from drilling, so that the gain of strength for the purpose of offsetting one series of stresses has been negatived by the collection and concentration of other stresses within the same common area.

On account of the different stratas and subsurface structures, and the various angles at which they lie, as well as the lack of uniformity of their hardness and their tendency to shift positions, it is generally impossible to bore a straight, perpendicular hole, consequently, any tubes used therein are subjected to a considerable angular stress which is passed from one tube to the next through the threaded connections. The direction of these angular stresses not only change as a result of raising and lowering the tubes through the irregular portion of the bore hole, but also change with the rotation of the string therein. These stresses are effectively localized in the string of pipe at the points of threaded engagement of the sections as alternate compressive and tensional stresses.

The conventional type of screw connection has not proven entirely satisfactory for connecting such types of tubes because these couplings do not support the portion of the tube within the coupling against angular stresses arising therebetween, and further, they permit the stresses and vibrations to which the tubes are subjected to become localized and effective within a narrowly limited area surrounding the point of termination of thread engagement.

As a result of the failure to support the end of the tube within the coupling, progressive fractures not only develop and cause many pipe failures at such points, but also the angular and other stresses to which the tubes are subjected cause the thread connections to give way with resultant leakage between the tube and the coupling, which is exceedingly detrimental, since the mud laden fluid being forced through the tubes under high pressure carries abrasive materials and any thread leakage of such fluid frequently results in the cutting away of both the coupling and the tube causing a failure in the pipe.

Further, any leakage from the drill pipe washes away the wall of the bore hole causing it to cave in or fall into the well. Such failures, at the couplings of the tubes, are the cause of heavy financial loss and unnecessary delay to the operators.

I am aware that attempts have been made, heretofore, to support the tubes within the couplings. The most common way of securing such support has been to pour metals having relatively high malleable qualities and rather low melting points, into recesses provided between the coupling element and the body of the tube which are allowed to solidify and are then corked in place. Inasmuch as such as the physical properties of such metals are much less than the properties of either the tube or the couplings, these metals yield and become loosened with a result that they do not thereafter support said tubes.

Another method of supporting the tubes has been to weld the pipe to the coupling member. However, welding has proven unsatisfactory because it not only melts a portion of the tube but mixes with the metal of the tube with the metal of the welding rod, and leaves a deposit of combined metal thereon, having the characteristics of cast steel of relatively low physical properties. In addition, the heat used in making the weld destroys or changes the physical properties of the tube adjacent the point of welding and tends to weaken the tube and to centralize stress at that point.

One object of the present invention is to provide a coupling for joining sections of drill pipe and the like, having an auxiliary fastening means which supports the tube within the coupling and is capable of distributing the stress resulting from the thread engagement.

Another object is to provide a coupling and the like, for joining tubes having an auxiliary fastening means which is capable of supporting the tube against angular stresses, so that tensional, torsional, and compressive stresses may be uniformly effective on the full periphery of the tube and coupling.

A further object is to provide a coupling for joining tubes and the like in which means are provided for dampening out the high pitched vibrations arising from use in drilling prior to their reaching the point of the thread engagement of the tubes with the coupling.

A still further object is to provide a coupling having means for preventing any leakage between the tubes and the coupling member.

A still further object is to provide a coupling for joining sections of metallic tubes which will be simple of construction, economical to manufacture and easily attached, and has auxiliary fastening means for supporting the tubes within the couplings which is capable of distributing the thread engagement stresses between the coupling and tubes; of embracing and supporting the tubes independent of their threaded engagement; of distributing the various stresses effective between the elements; and of checking vibrations arising therebetween.

These and other objects which will hereinafter be made apparent to those skilled in this particular art are accomplished by means of this invention, one embodiment of which is described in the following specification and illustrated in the accompanying drawings, wherein:

Figure 1 is a view in elevation of a part of a string of drill pipe shown within a well bore hole;

Fig. 2 is a view in section of a pair of tool joints showing the seats for the auxiliary fastening members and leak stoppage members;

Fig. 3 is a view partially in section of a tool joint showing the relation of the parts when the coupling is attached to the ends of drill pipes;

Fig. 4 is an enlarged section of a portion of the tool joint showing the auxiliary fastener and the leak stoppage member in place between the tool joint and the drill pipe but before it is locked in place;

Fig. 5 is a section similar to Fig. 4 with the coupling locked in place on the drill pipe;

Fig. 6 is a perspective view of the auxiliary fastener before it is severed into segments;

Fig. 7 is a view of one segment of the auxiliary fastener;

Fig. 8 is a perspective view of the leak stoppage member;

Figure 9:
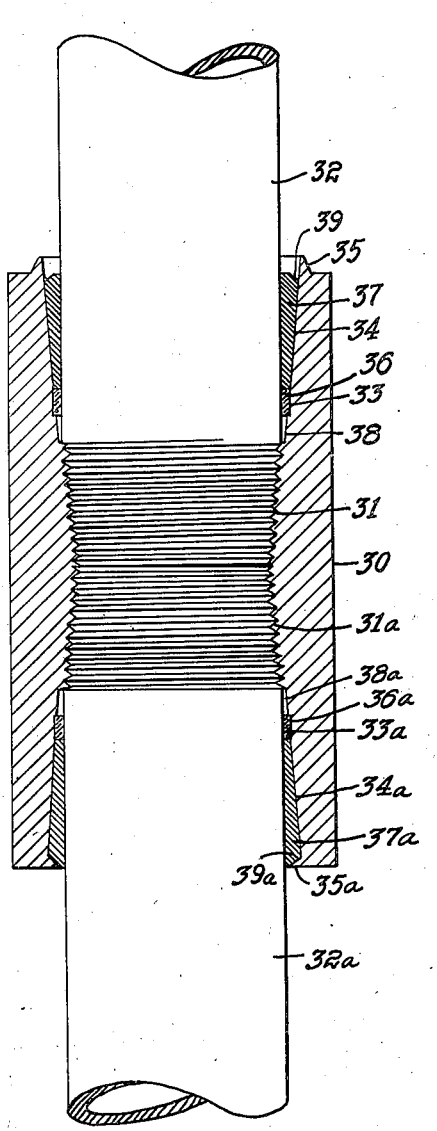
Fig. 9 is a sectional view illustrating the application of my invention to a casing or drill pipe coupling member.

Referring to the drawings, in Figs. 1-5, inclusive, I have illustrated my invention as applied to a tool joint 10 for connecting the adjacent ends of two sections of drill pipe 11 and 12.

The tool joint 10 comprises two cylindrical members 13 and 13a, one of which is adapted to be secured to the end of each of the tubes 11 and 12. Each of the members 13 and 13a is provided with a tapered socket 14 and 14a, and with an axial bore 15 and 15a, which forms a water passageway through the tool joint. The member 13 is provided with a threaded tapered pin 16θ on the end thereof which is received in a threaded tapered socket 17 on the member 13a when the tool joint is to be assembled. The sockets 14 and 14a are cut on a diametrical taper and the inner ends are threaded as at 18 and 18a for receiving the threaded end of the pipes 11 and 12.

In order to support the pipes 11 and 12 within the cylindrical members 13 and 13a, respectively, the walls of the sockets 14 and 14a extend a substantial distance beyond the threads 18 and 18a and each is provided with a cylindrical seat 19 and 19a, respectively, which is cut in the tapered faces of the sockets for receiving a leak stoppage member 20, and a tapered seat 21 and 21a for receiving an auxiliary fastening wedge 22. The sockets 14 and 14a terminate at the ends of the members 13 and 13a in upstanding lips 23 and 23a, the purpose of which will be hereinafter described.

In assembling the tool joint, the members 13 and 13a are threaded onto the ends of the pipes 11 and 12, respectively. The leak stoppage members 20 which are formed of rubber or some other suitable resilient material, are then placed on the seats 19 and 19a, and the auxiliary wedge members 22 are then positioned on the seats 21 and 21a and form a circle surrounding the pipes 11 and 12. The auxiliary fastening wedges have a tapered face of substantially the same diametrical taper as the seats 21 and 21a and a cylindrical face which is adapted to seat against the side of the pipe. These auxiliary fastening wedges which may be formed by turning the outer surface of an annular tube or cylinder to the required cross-sectional areas are in the form of annular segments to permit their proper relative position when inserted between the seats 21 and 21a and the walls of the tubes 11 and 12, which are not always fully concentric with the members 13 and 13a.

These wedges 22 are driven or otherwise forced onto the seats 21 and 21a and because of the diametrical taper of the seats and the face of the fastener wedges, a considerable wedging action takes place between the sections of the drill pipe and the members 13 and 13a of the tool joint 10, which compresses the leak stoppage members 20 and forces them to flow into triangular shaped openings 24 and 24a between the walls of the drill pipes 11 and 12 and the members 13 and 13a, respectively.

The lips 23 and 23a on the members 13 and 13a are then preened or rolled down on beveled faces 25 on the upper ends of the wedge members 22, which securely lock the wedge members in position and fasten the members 13 and 13a to the ends of the pipes 11 and 12. The members 13 and 13a are then secured together by threading the pin 16 into the socket 17.

From this construction, it will be seen that the angular stress area arising from contrary forces applied to the drill pipes, such as at A and B, within the well bore C (Fig. 1) will be transmitted to the tool joints 10 through the fasteners 22 which transmission considerably lessens the compressive force on one side of the threaded portions of the joint and the tensional force on the other side thereof.

It is also apparent that the points at which the drill pipe is ordinarily changed from a compressively stressed state to a state of rest, usually adjacent the top thread on the pipe, has been moved to an unthreaded portion of the pipe by the compressive action of the fasteners. And further, because of the wedging action of the fasteners, any vibration arising in the drill pipe will be dampened before reaching the point of the threaded connection between the pipes 11 and 12 and the members 13 and 13a.

As the wedging action of the fasteners 22 makes a secure connection between the section of drill pipes 11 and 12 and the members 13 and 13a which is somewhat less secure than the threaded connection between them, it is apparent that various stresses and vibrations arising in the drill pipe are not susceptible to the same degree of localization as in the conventional threaded connection and that as a result, the breakage heretofore caused through progressive fractures due to the localization of the stresses is thereby greatly minimized and practically eliminated. Further, even if the mud laden fluid should leak through the threaded connections between the pipes 11 and 12 and the members 13 and 13a, the fluid will be retained within the pipes and the tool joint by the leak stoppage members 20, and as a result the abrasive materials cannot cut away the ends of the pipe and failure for this reason is entirely eliminated.

In Fig. 9, I have shown my auxiliary fastener as applied to a coupling or joint 30 connecting sections of drive pipe or casings.

In such assembly, coupling 30 which is tubular in form and is internally tapered from the center to each end thereof is provided with internally threaded sections 31 and 31a for receiving the threaded end of adjoining sections of drive pipe or casing 32 and 32a. The wall of the coupling 30 extends a considerable distance beyond the threaded sections 31 and 31a and is provided with cylindrical seats 33 and 33a, and tapered faces 34 and 34a which terminate at the ends of the coupling in upstanding lips 35 and 35a. After the pipes 32 and 32a have been threaded into the coupling 30, leak stoppage members 36 and 36a are positioned on the cylindrical seats 33 and 33a which are held in place by wedge shaped annular segmental members 37 and 37a positioned on the seats 34 and 34a. The members 37 and 37a which are driven into the seat 34 and 34a are tightly wedged between pipes 32 and 32a and the coupling 30, and force the leak stoppage members 36 and 36a to flow into triangular shaped openings 38—38a between the coupling and the ends of the pipes 32 and 32a. The wedge members 37 and 37a are held firmly in place by the lips 35—35a, which are pressed or rolled down over beveled faces 39—39a on the ends of the members.

After a joint of pipe has been threaded into one end of the coupling 30 and the fastener 37 and the leak stoppage member 36 have been secured in place, it is lowered into the bore hole and another joint of pipe is then threaded into and secured in the other end of the coupling. Another coupling is then secured into the other end of the second joint and a third section of pipe is then secured to this second coupling. This process is repeated until a string of pipe of desired length is secured.

Figure 10:
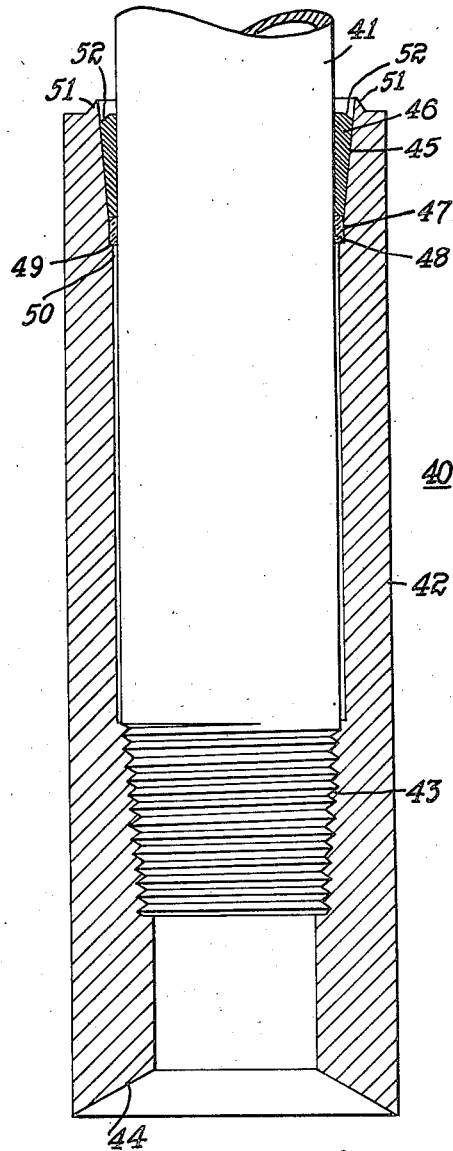
Fig. 10 is a sectional view showing the application of my invention to a drive shoe.

In Fig. 10 I have shown my improved auxiliary fastener applied to a drive shoe 40, which is adapted to be threaded onto the lower end of a string of drive pipe 41. The drive shoe 40 comprises a tubular body 42 and a portion of its bore is provided with a tapered thread 43 for receiving the threaded end of the pipe 41. The portion of the bore below the thread 43 is of reduced diameter and terminates at the bottom in a beveled surface 44 forming the shearing surface for the shoe.

So that the drive shoe 40 will be securely held in position on the end of the pipe 41, the upper end thereof extends a substantial distance beyond the threads 43 and is provided with an internally tapered surface forming a seat 45 for a wedge-shaped fastening member 46 and a cylindrical seat 47 for receiving a leak stoppage member 48, both the fastening member and the leak stoppage member are of the same construction and material heretofore described.

In assembling the drive shoe on the end of the pipe, the shoe is threaded over the end of the pipe and the leak stoppage member 48 is positioned on the cylindrical seat 47. The wedge-shaped auxiliary fastener members 46 are then positioned around the pipe on the seat 45 and are driven into place so that they tightly engage the wall of the pipe 41 and compress the leak stoppage member 48 against the shoulder 49 and cause it to flow into a triangular shaped space 50 between the wall of the pipe 41 and the drive shoe 40. The wedge members 46 are held in place by peening or rolling a lip 51 on the upper end of the drive shoe over a beveled face 52 on the upper end of the wedge members.

From this construction it is apparent that any axial strains arising within the drill pipe 41 will be transmitted through the auxiliary fastening members 46 to the drive shoe 40 and materially reduce their effect upon the threaded portions of the connection therebetween.

While I have illustrated one embodiment of my invention as applied to various types of pipe couplings and the like, it is understood that my invention may be embodied in other forms without departing from the spirit of the invention or the scope of the appended claims.

What I claim as new and desire to secure by Letters Patent is:

1. In combination with a tool joint having a tapered threaded section for receiving the end of a pipe, of an integrally formed extension on said joint having an outwardly tapering inner surface, an auxiliary fastener adapted to seat on said tapered surface and to tightly engage the wall of said pipe, and a lip on said tool joint adjacent the end of said tapered surface, adapted to be bent over the top of said fastener to rigidly hold it in place.

2. In combination with a tubular tool joint having an internally threaded section for receiving the end of a pipe and a tapered surface above said threaded section provided with a cylindrical seat, of a resilient member positioned on said cylindrical seat, an annular fastener above said resilient member and seating against said tapered surface, said fastener adapted to be wedged between the wall of the pipe and the tapered surface, and means integral with said coupling for locking said fastener in wedging position.

3. In combination with a tool joint having a threaded section for engaging the end of a pipe and a tapered surface extending beyond said section, of means independent of the threaded connection for supporting the pipe in said joint comprising a series of arcuate wedges disposed on said tapered surface and driven into holding engagement with the wall of the pipe and said surface, and means on said joint adapted to be rolled over the tops of said wedges for holding them in position.

4. In a tool joint for rotary drill pipe having a threaded counterbore for threadedly engaging the drill pipe, of means for supporting the drill pipe within the said tool joint, in addition to and independent of said threaded means, comprising a rigid metallic filler adapted to fit around said drill pipe within an extension of the counterbore of said joint, and a lip extension on said joint for riveting over said metallic filler to hold said filler in place.

5. The combination comprising a tubular pipe coupling having an internally threaded section for threadedly engaging the end of a pipe section, a tapered section extending a substantial distance beyond the threaded section, means independent of said thread for supporting said pipe within the extension on said coupling, means for sealing the space between said auxiliary supporting means and the threaded connection, and means on the end of the coupling and integral therewith for locking said auxiliary supporting means in position in said coupling.

6. The combination comprising a tubular coupling having an internally threaded portion, a section of pipe adapted to be threadedly secured in said coupling, said coupling having a portion thereof extending a substantial distance beyond the threaded section and provided with a beveled surface adjacent the wall of said pipe, an auxiliary fastening member adapted to seat on said beveled surface for supporting the pipe within said coupling, and a lip on the end of said coupling adapted to engage a beveled surface on the top of said fastener member for holding it in position between said pipe and coupling.

7. The combination with a pipe coupling having a socket therein, the inner end of which is threaded for engaging the thread on the end of a section of pipe and the outer end is beveled outwardly, of means independent of the thread connection for supporting the pipe within the coupling and for sealing the connection comprising a resilient member disposed between the pipe and the coupling, a series of arcuate wedge members seating on said beveled surface and bearing against said resilient member, said members being adapted to be driven into the space between said pipe and coupling to lock the same together and to compress said resilient member and force it to flow into the space above said thread, and means integral with said coupling adapted to engage the tops of said members and hold them in position between said pipe and coupling.

8. Auxiliary supporting and sealing means for a pipe joint comprising in combination, a tubular coupling having an internally threaded section, a cylindrical section, and a beveled section, a section of pipe threadedly connected to said coupling, a resilient member surrounding said pipe and seated on said cylindrical section, a series of arcuate wedge segments surrounding the pipe and seated on said beveled surface, said wedge segments being adapted to be driven into holding engagement between said surface and pipe and to force said resilient member to flow into the space above said threads, and a lip on said coupling engaging the tops of said wedge segments for holding them in wedging relation with said pipe and coupling.

9. In combination with a tool joint having a threaded section for engaging the end of a pipe and a tapered surface extending beyond said threaded section, of means independent of the threaded connection for supporting the pipe in said joint comprising a series of arcuate wedge members disposed on said tapered surface and driven into holding engagement with the wall of the pipe and said surface, and means for holding said wedge members in position between the pipe and the tapered surface of said joint.

10. In combination with a plurality of pipe sections each having a threaded end, of means for joining said sections together comprising a tubular coupling having an internally threaded section for threadably engaging the ends of the pipe sections, a tapered section extending a substantial distance beyond the threaded section, an auxiliary fastener disposed on said tapered surface and driven into holding engagement with the wall of the pipe and said surface, and means for locking said auxiliary fastener in position on the tapered surface of said coupling.

FERDINAND J. SPANG.